United States Patent
Vaddiraju et al.

(10) Patent No.: US 11,207,973 B1
(45) Date of Patent: Dec. 28, 2021

(54) ACTIVE CONTROLLED INTEGRATED AERODYNAMIC FLAP SYSTEM

(71) Applicant: GM GLOBAL TECHNOLOGY OPERATIONS LLC, Detroit, MI (US)

(72) Inventors: Srinivasa Rao Vaddiraju, Troy, MI (US); Nicholas J. Christoff, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/068,948

(22) Filed: Oct. 13, 2020

(51) Int. Cl.
*B60K 11/08* (2006.01)
*B62D 35/00* (2006.01)

(52) U.S. Cl.
CPC .......... *B60K 11/085* (2013.01); *B62D 35/005* (2013.01)

(58) Field of Classification Search
CPC ....... B60K 11/04; B60K 11/08; B60K 11/085; B62D 35/005
USPC .......................................... 296/180.1, 180.3
See application file for complete search history.

(56) References Cited

U.S. PATENT DOCUMENTS

| | | | | |
|---|---|---|---|---|
| 8,118,124 B2* | 2/2012 | Shin | ..................... | B60K 11/085 180/68.1 |
| 9,616,742 B1* | 4/2017 | Uehara | ................ | B60K 11/085 |
| 2012/0100790 A1* | 4/2012 | Miesterfeld | ............... | F01P 7/10 454/75 |
| 2019/0143785 A1* | 5/2019 | Tilbury | .................... | F01P 7/10 165/271 |

FOREIGN PATENT DOCUMENTS

| | | | | |
|---|---|---|---|---|
| DE | 102016007369 A1 * | 12/2017 | ........... | B60K 11/085 |
| DE | 102019122004 A1 * | 10/2020 | ............. | B60K 11/04 |
| GB | 2515640 A * | 12/2014 | ........... | B60K 11/085 |

* cited by examiner

*Primary Examiner* — Jason S Daniels
(74) *Attorney, Agent, or Firm* — Quinn IP Law

(57) ABSTRACT

An actively controlled flap system includes a bar defining a rotational axis, a first flap rotatably coupled to the bar and configured to rotate about the rotational axis, and a second flap rotatably coupled to the bar and configured to rotate about the rotational axis, the second flap including an opening extending through the second flap. The first flap is rotatable between a first position in which the opening in the second flap is covered by the first flap and a second position in which the opening in the second flap is uncovered, and the second flap is rotatable between a third position and a fourth position.

20 Claims, 5 Drawing Sheets

ACTIVE CONTROLLED INTEGRATED AERODYNAMIC FLAP SYSTEM

The present disclosure relates generally to variable-flow air regulation systems for vehicles including a plurality of actively controlled aerodynamic surfaces.

Vehicles may use airflow to cool components within an engine compartment, including the engine or transmission for internal combustion engine vehicles. Airflow may also be used to cool components like battery and power electronics for electric vehicles, or a combination thereof for hybrid vehicles. Airflow may also be directed to the passenger compartment, for combustion, or for other uses. Other components may be cooled directly or indirectly with airflow, including brakes, electronics, motors, etc. However, the components and systems utilizing airflow may not always require the full amount of airflow available to the vehicle. Variable airflow components may be used to selectively open or close airflow passages, holes, or ducts.

SUMMARY

Embodiments according to the present disclosure provide a number of advantages. For example, embodiments according to the present disclosure enable multi-directional airflow using a system of active flaps configured to open at different angles to allow controlled airflow to the heat exchangers and/or direct airflow to other areas of a vehicle.

In one aspect of the present disclosure, an actively controlled flap system includes a bar defining a rotational axis, a first flap rotatably coupled to the bar and configured to rotate about the rotational axis, and a second flap rotatably coupled to the bar and configured to rotate about the rotational axis. The second flap includes an opening extending through the second flap. The first flap is rotatable between a first position in which the opening in the second flap is covered by the first flap and a second position in which the opening in the second flap is uncovered, and the second flap is rotatable between a third position and a fourth position.

In some aspects, the first position is a closed position of the first flap and the second position is an open position of the first flap.

In some aspects, the third position is a closed position of the second flap and the fourth position is an open position of the second flap.

In some aspects, the actively controlled flap system further includes a sensor configured to measure a vehicle characteristic.

In some aspects, the sensor includes a flap system sensor configured to measure a characteristic of the flap system and a vehicle sensor configured to measure one of a vehicle speed and an ambient temperature.

In some aspects, the actively controlled flap system further includes an actuator coupled to at least one of the bar, the first flap, and the second flap, and a controller in electronic communication with the actuator, the flap system sensor, and the vehicle sensor. The controller is configured to receive sensor data from the flap system sensor and the vehicle sensor, determine an operating position of one or more of the first and second flaps, and generate a control signal to control the actuator to adjust a position of one or more of the first and second flaps.

In some aspects, the actively controlled flap system further includes an actuator coupled to the bar, a first rotation member configured to rotate with the bar, and a second rotation member configured to rotate with the bar. The first rotation member interfaces with the first flap to rotate the first flap between the first position and the second position and the second rotation member interfaces with the second flap to rotate the second flap between the third position and the fourth position.

In some aspects, the opening is a first opening and the flap system further includes a third flap rotatably coupled to the bar and configured to rotate about the rotational axis, the third flap including a second opening extending through the third flap, and the third flap is rotatable between a fifth position and a sixth position.

In another aspect of the present disclosure, an actively controlled flap system includes an actuator, a rotatable bar coupled to the actuator, the rotatable bar defining a rotational axis, a first rotation member configured to rotate with the rotatable bar, a second rotation member configured to rotate with the rotatable bar, a first flap rotatably coupled to the rotatable bar and configured to rotate about the rotational axis, and a second flap rotatably coupled to the rotatable bar and configured to rotate about the rotational axis. The first rotation member interfaces with the first flap to rotate the first flap between a first flap position and a second flap position and the second rotation member interfaces with the second flap to rotate the second flap between a third flap position and a fourth flap position.

In some aspects, the first flap position is a closed position of the first flap and the second flap position is an open position of the first flap.

In some aspects, the third flap position is a closed position of the second flap and the fourth flap position is an open position of the second flap.

In some aspects, the actively controlled flap system further includes a sensor configured to measure a vehicle characteristic.

In some aspects, the sensor includes a flap system sensor configured to measure a characteristic of the flap system and a vehicle sensor configured to measure one of a vehicle speed and an ambient temperature.

In some aspects, the actively controlled flap system further includes a controller in electronic communication with the actuator, the flap system sensor, and the vehicle sensor. The controller is configured to receive sensor data from the flap system sensor and the vehicle sensor, determine an operating position of one or more of the first and second flaps, and generate a control signal to control the actuator to adjust a position of one or more of the first and second flaps.

In another aspect of the present disclosure, an automotive vehicle includes a vehicle body, a grille system coupled to the vehicle body, the grille system including a first heat exchanger mounted at a first location and a second heat exchanger mounted at a second location, a bar defining a rotational axis, a first flap rotatably coupled to the bar and configured to rotate about the rotational axis, and a second flap rotatably coupled to the bar and configured to rotate about the rotational axis, the second flap including an opening extending through the second flap. The first flap is rotatable between a first position in which the opening in the second flap is covered by the first flap and a second position in which the opening in the second flap is uncovered, and the second flap is rotatable between a third position and a fourth position.

In some aspects, the first position is a closed position of the first flap and the second position is an open position of the first flap.

In some aspects, the third position is a closed position of the second flap and the fourth position is an open position of the second flap.

In some aspects, the automotive vehicle further includes a flap system sensor configured to measure a characteristic of the flap system and a vehicle sensor configured to measure one of a vehicle speed and an ambient temperature.

In some aspects, the automotive vehicle further includes an actuator coupled to at least one of the bar, the first flap, and the second flap, and a controller in electronic communication with the actuator, the flap system sensor, and the vehicle sensor. The controller is configured to receive sensor data from the flap system sensor and the vehicle sensor, determine an operating position of one or more of the first and second flaps, and generate a control signal to control the actuator to adjust a position of one or more of the first and second flaps.

In some aspects, the automotive vehicle further includes an actuator coupled to the bar, a first rotation member configured to rotate with the bar, and a second rotation member configured to rotate with the bar. The first rotation member interfaces with the first flap to rotate the first flap between the first position and the second position and the second rotation member interfaces with the second flap to rotate the second flap between the third position and the fourth position.

BRIEF DESCRIPTION OF THE DRAWINGS

The present disclosure will be described in conjunction with the following figures, wherein like numerals denote like elements.

Figure 1:
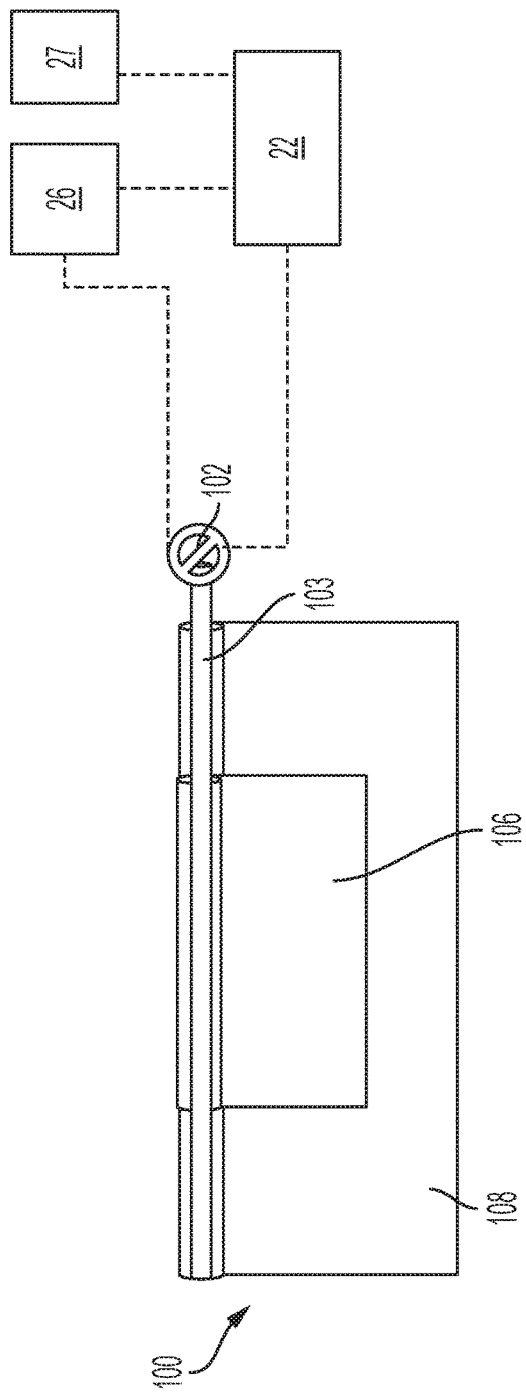
FIG. 1 is a schematic front view of an active controlled integrated flap system, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

While the present invention is described in detail with respect to automotive applications, those skilled in the art will recognize the broader applicability of the invention. Those having ordinary skill in the art will recognize that terms such as "above," "below," "upward," "downward," etc., are used descriptively of the figures, and do not represent limitations on the scope of the invention, as defined by the appended claims.

Referring to the drawings, wherein like reference numbers correspond to like or similar components whenever possible throughout the several figures, there is shown schematically in FIGS. 1 and 2A-2C a flap system 100 for a vehicle. In various embodiments, the flap system 100 includes a first flap 106 and a second flap 108. The first flap 106 and the second flap 108 are configured to rotate about a common axis of rotation, such as a bar 103. In various embodiments, the flap system 100 includes an actuator 102 coupled to the bar 103. In various embodiments, the bar 103 is rotatable by the actuator 102. In some embodiments, the bar 103 is an axis of rotation but does not itself rotate. The bar 103 defines a rotational axis of the flap system 100. In various embodiments, the first flap 106 is rotatably coupled to the bar 103 and, similarly, the second flap 108 is also rotatably coupled to the bar 103. Each of the first flap 106 and the second flap 108 is rotatable, either together or individually, by any actuation mechanism. One example of a rotation mechanism is described herein; however, it is understood that the first and second flaps 106, 108 may be rotated about the common axis of rotation using any means including, for example and without limitation, an actuator 102 coupled to each of the first and second flaps 106, 108.

Figure 2C:
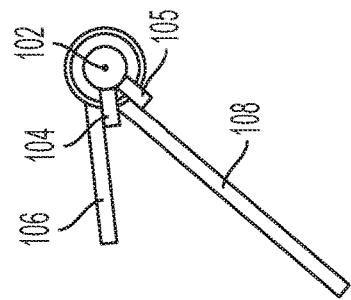
FIG. 2C is a schematic side view of an active controlled integrated flap system in a third configuration, according to an embodiment.
Figure 2B:
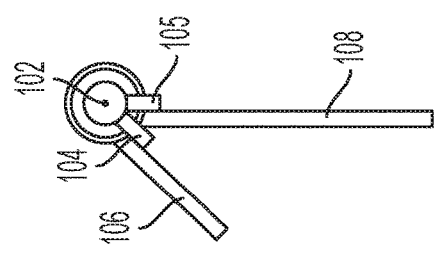
FIG. 2B is a schematic side view of an active controlled integrated flap system in a second configuration, according to an embodiment.
Figure 2A:
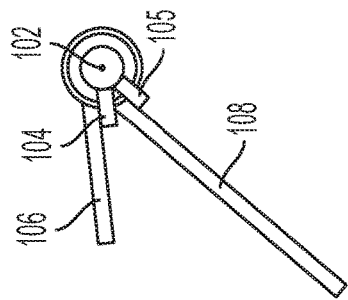
FIG. 2A is a schematic side view of an active controlled integrated flap system in a first configuration, according to an embodiment.

In various embodiments, as shown in FIGS. 2A-2C, the bar 103 includes a first rotation member 104 and a second rotation member 105. The first rotation member 104 interfaces with at least a portion of the first flap 106 and the second rotation member 105 interfaces with at least a portion of the second flap 108. Actuation of the actuator 102 causes rotation of the bar 103, and thus rotation of the first and second rotation members 104, 105. The first rotation member 104 acts on the first flap 106 to induce a rotation of the first flap 106 around the rotational axis defined by the bar 103. Similarly, the second rotation member 105 acts on the second flap 108 to induce a rotation of the second flap 108 around the rotational axis defined by the rotatable bar 103.

As shown in subsequent figures, the second flap 108 includes an opening that is covered by the first flap 106 when the first flap 106 is in a closed position, as shown in FIG. 1 and FIG. 2A. In various embodiments, the first flap 106 defines a smaller area than the second flap 108. The first and second flaps 106, 108 are independently actuatable and rotatable about the rotational axis of the flap system 100. In various embodiments, the first flap 106 is actuatable and rotatable between a first position and a second position, wherein the first position is a closed position and the second position is an open position. Similarly, in various embodiments, the second flap 108 is independently actuatable and rotatable between a third position and a fourth position, wherein the third position is a closed position and the fourth position is an open position. In various embodiments, the actuator 102 acts on the first and second rotation members 104, 105 independently such that the first flap 106 is in a closed position when the second flap 108 is in an open position. In various embodiments, the actuator 102 acts on the first and second rotation members 104, 105 independently such that the first flap 106 is in an open position when the second flap 108 is in a closed position.

As shown in FIGS. 2A-C, in the illustrated embodiment, the first and second flaps 106, 108 are independently rotated via the rotation of the first and second rotation members 104, 105. In various embodiments, the position of the first rotation member 104 relative to the second rotation member 105 is fixed such that actuation of the actuator 102 results in rotation of the first and second rotation members 104, 105 from a first rotation member position, shown in FIG. 2A, in which both of the first and second flaps 106, 108 are in a closed position, to a second rotation member position, shown in FIG. 2B, in which the first flap 106 is in an open position while the second flap 108 is in a closed position. In various embodiments, when the rotation members 104, 105 are in the second rotation member position shown in FIG. 2B, the first flap 106 is in a partially open position. Further actuation of the actuator 102 results in continued rotation of the first and second rotation members 104, 105 to a third rotation member position, shown in FIG. 2C, in which both of the first and second flaps 106, 108 are in an open position. In various embodiments, when the rotation members 104, 105 are in the third rotation member position shown in FIG. 2C, the first flap 106 is in a fully open position.

In various embodiments, the actuator 102 is coupled to a controller 22, as shown in FIG. 1. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle, including the flap system 100.

With continued reference to FIG. 1, in various embodiments, the flap system 100 further includes at least one flap system sensor 26. The flap system sensor 26 is configured to measure various operational parameters of the flap system 100 including, for example and without limitation, a position of the actuator 102, a position of the first and second rotation members 104, 105, and a position of the first and second flaps 106, 108. The flap system sensor 26 is in electronic communication with the controller 22.

In various embodiments, the controller 22 is also in electronic communication with a plurality of vehicle sensors 27. The plurality of vehicle sensors 27 are configured to measure various operational parameters of the vehicle including vehicle speed, ambient temperature, etc., for example and without limitation. The plurality of vehicle sensor 27 are also configured to measure drive unit temperatures, power electronic temperatures, battery temperatures, and/or cabin temperatures, for example and without limitation.

Figure 4:
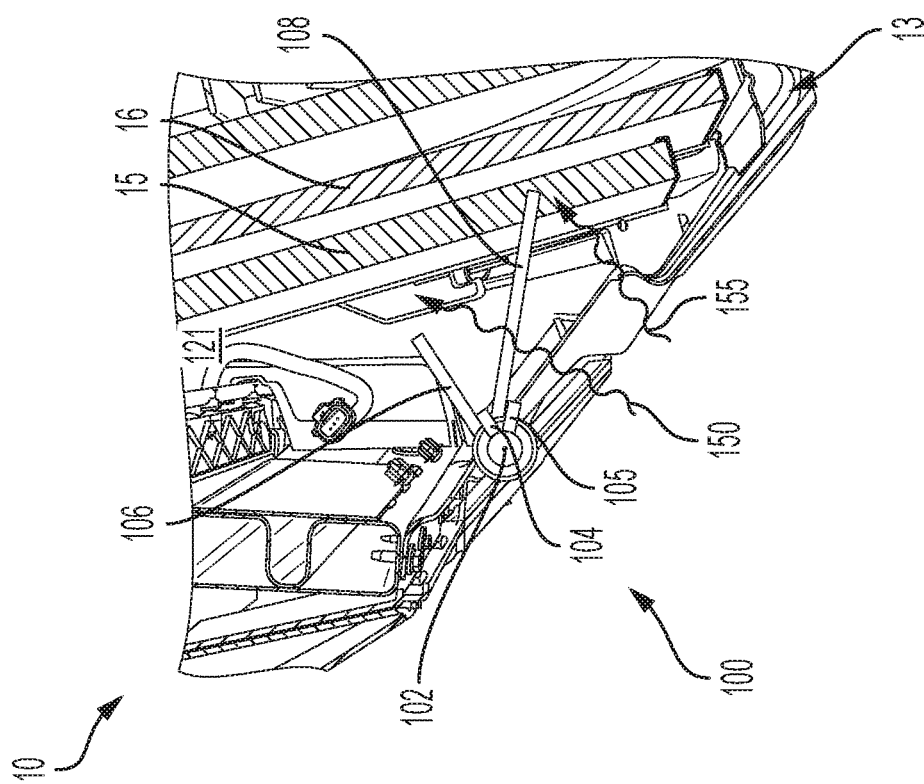
FIG. 4 is a schematic partial side view of a vehicle body including the active controlled integrated flap system of FIG. 1 in an open configuration, according to an embodiment.
Figure 3:
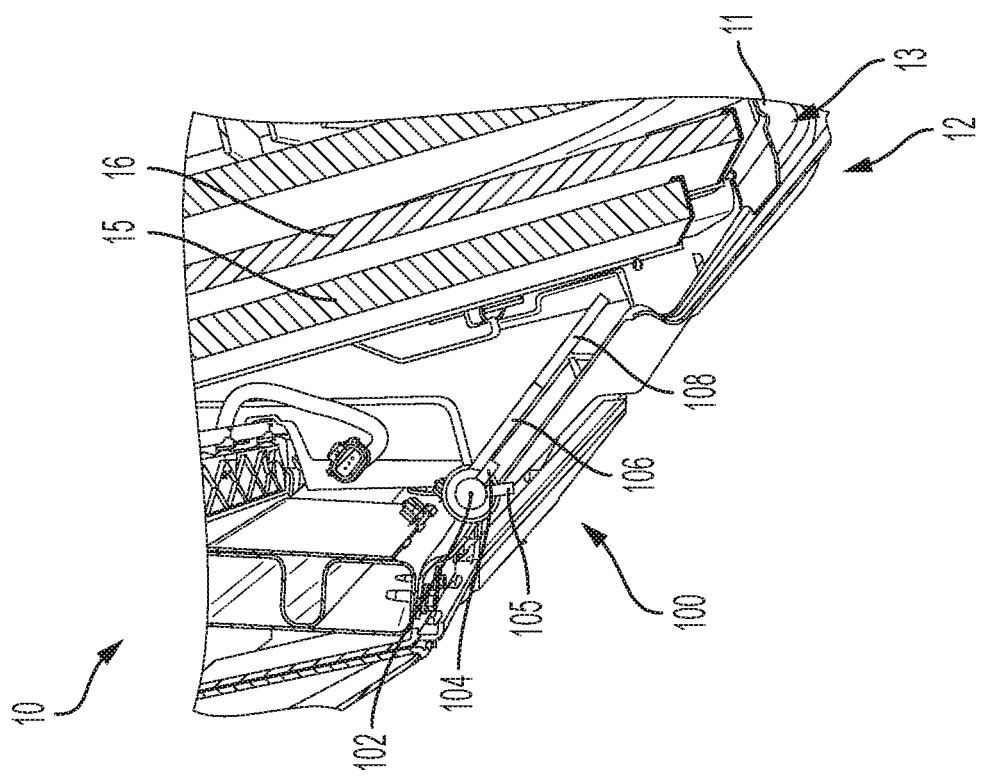
FIG. 3 is a schematic partial side view of a vehicle body including the active controlled integrated flap system of FIG. 1 in a closed configuration, according to an embodiment.

FIGS. 3 and 4 are schematic diagrams of a grille system 12 for a vehicle 10 (only portions of which are shown). FIGS. 3 and 4 illustrate a side view of some of the primary components of the grille system 12, which is located within a front fascia 13. The grille system 12 may be placed in other locations of the vehicle 10 and the specific location shown is not limiting. Features and components shown in other figures may be incorporated and used with those shown in FIGS. 3 and 4.

The front fascia 13 is coupled to a vehicle body 11. The vehicle body 11 includes, in various embodiments, a first heat exchanger 15 and a second heat exchanger 16 coupled to the vehicle body 11 and included within the grille system 12. In various embodiments, the first heat exchanger 15 is mounted at a first location and the second heat exchanger 16 is mounted at a second location below or beneath the first heat exchanger 15.

The flap system 100 is coupled to the vehicle body 11 within the grille system 12. The flap system 100 is positioned ahead, or in front of, the first and second heat exchangers 15, 16. In other words, the flap system 100 is positioned within the grille system 12 forward of the first and second heat exchangers 15, 16. As shown in FIGS. 3 and 4 and discussed above with respect to FIGS. 1 and 2A-C, the flap system 100 includes a plurality of flaps that are independently operated to enable airflow to one or both of the first and second heat exchangers 15, 16, or other areas of the vehicle 10, or, in various scenarios, to block airflow to one or both of first and second heat exchangers 15, 16 or other areas of the vehicle 10.

The integrated flap system 100 illustrated in FIGS. 3 and 4 may be packaged in a limited space ahead or in front of vehicle components that may, in various scenarios, need additional cooling airflow. Additionally, independently operated plurality of flaps of the flap system 100 enable multi-directional airflow.

FIG. 3 illustrates the flap system 100 with the first and second flaps 106, 108 in a closed position. In this position, the airflow is not permitted through the flap system 100. This configuration is appropriate when airflow to vehicle components, such as the first and second heat exchangers 15, 16, is not needed. Closure of the first and second flaps 106, 108 of the flap system 100 provides improved drive range and reduced drag force on the vehicle 10.

FIG. 4 illustrates the flap system 100 with the first and second flaps 106, 108 in an open position. In the illustrated embodiment, both of the first and second flaps 106, 108 are open; however, in other configurations only the first flap 106 may be opened, as discussed herein. The opening in the second flap 108, normally covered by the first flap 106, enables airflow 150 to the first heat exchanger 15, for example and without limitation. The position of the second flap 108 in the open position shown in FIG. 4 enables airflow 155 to the second heat exchanger 16, for example and without limitation.

Figure 5:
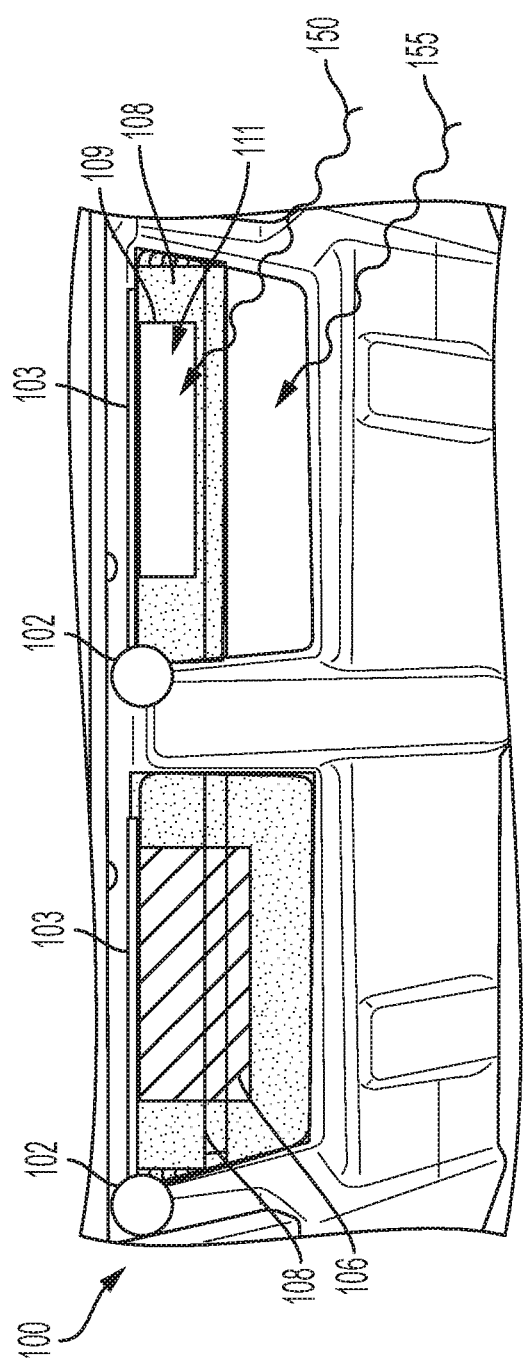
FIG. 5 is a schematic partial front view of a vehicle body including an active controlled integrated flap system in a closed configuration and an active controlled integrated flap system in an open configuration, according to an embodiment.

With reference now to FIG. 5, a view of the flap system 100 in both a closed and open configuration is shown in a front view. The left side of FIG. 5 illustrates the flap system 100 in a closed configuration and the right side of FIG. 5 illustrates the flap system 100 in an open configuration. The second flap 108 includes an edge 109 defining a first opening 111. The first opening 111 is positioned and configured such that when the first flap 106 is in the closed position, the first opening 111 is substantially or fully obscured, that is, that airflow 150 is not permitted through the first opening 111.

Figure 7:
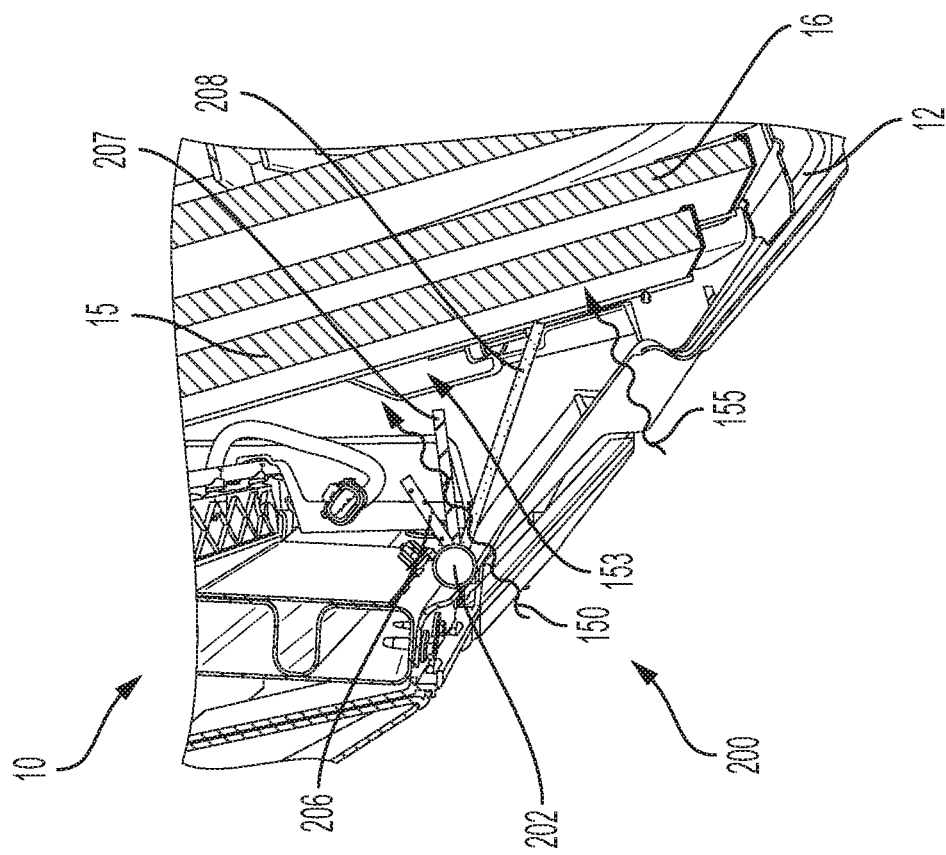
FIG. 7 is a schematic partial side view of a vehicle body including the active controlled integrated flap system of FIG. 6 in an open configuration, according to an embodiment.
Figure 6:
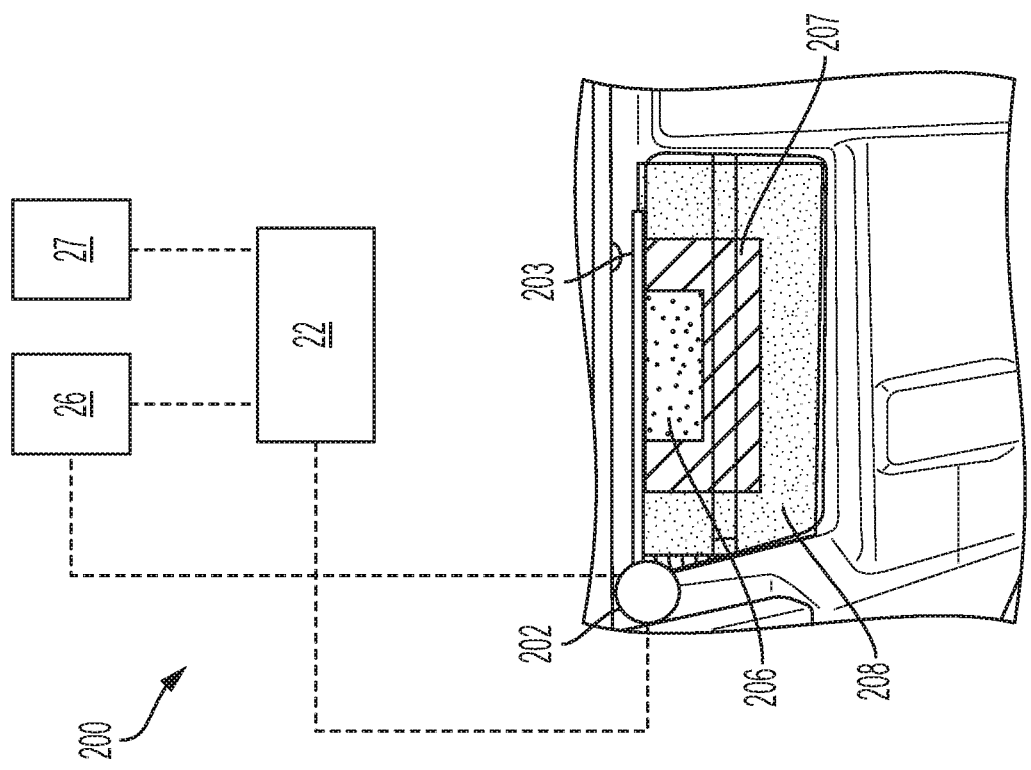
FIG. 6 is a schematic partial front view of a vehicle body including an active controlled integrated flap system in a closed configuration, according to another embodiment.

Another embodiment of a flap system 200 is illustrated in FIGS. 6 and 7. In various embodiments, the flap system 200 includes a first flap 206, a second flap 207, and a third flap 208. The first flap 206, the second flap 207, and the third flap 208 are configured to rotate about a common axis of rotation, such as a bar 203. In various embodiments, the flap system 200 includes an actuator 202 coupled to the bar 203. In various embodiments, the bar 203 is rotatable by the actuator 202. In some embodiments, the bar 203 is an axis of rotation but does not itself rotate. The bar 203 defines a rotational axis of the flap system 200. The first flap 206 is rotatably coupled to the bar 203, the second flap 207 is rotatably coupled to the bar 203, and, similarly, the third flap 208 is also rotatably coupled to the bar 203. Each of the first flap 206, the second flap 207, and the third flap 208 is rotatable, either together or individually, by any actuation mechanism. One example of a rotation mechanism is described herein; however, it is understood that the first, second, and third flaps 206, 207, 208 may be rotated about the common axis of rotation using any means including, for example and without limitation, an actuator 202 coupled to each of the first, second, and third flaps 206, 207, 208.

While not shown, in some embodiments, rotation members are coupled to or integrated with the bar 203. In various embodiments, a separate rotation member is coupled to each of the first, second, and third flaps 206, 207, 208. The rotation members, similar to the first and second rotations members 104, 105, act on the first, second, and third flaps 206, 207, 208. In various embodiments, actuation of the actuator 202 causes rotation of the bar 203, and thus rotation of the rotation members, which in turn act on the respective flap 206, 207, 208 to induce rotation of one or more of the flaps 206, 207, 208 around the rotational axis defined by the bar 203.

Similar to the flap system 100, the second flap 207 includes a first opening that is covered by the first flap 206 when the first flap 206 is in a closed position and the third flap 208 includes a second opening that is covered by the second flap 207 when the second flap 207 is in a closed position. In various embodiments, the first flap 206 defines a smaller area than the second flap 207. In various embodiments, the first flap 206 is actuatable and rotatable between a first position and a second position, wherein the first position is a closed position and the second position is an open position. Similarly, in various embodiments, the second flap 207 is independently actuatable and rotatable between a third position and a fourth position, wherein the third position is a closed position and the fourth position is an open position. Additionally, in various embodiments, the third flap 208 is independently actuatable and rotatable between a fifth position and a sixth position, wherein the fifth position is a closed position and the sixth position is an open position.

As shown in FIG. 7, the first, second, and third flaps 206, 207, 208 are actuated independently from one another between open and closed positions, and to intermediate positions between the open and closed positions. In various embodiments, the first flap 206 is opened independent of the second and third flaps 207, 208 to permit airflow 150 through the first opening in the second flap 207. In various embodiments, the second flap 207 is opened independent of the first and third flaps 206, 208 to permit airflow 153 through the second opening in the third flap 208. In various embodiments, the third flap 208 is opened independent of the first and second flaps 206, 207 to permit airflow 155. In various embodiments, the first, second, and third flaps 206, 207, 208 are each actuated to an open position, which may be a fully open or partially open position, depending on the desired airflow to the vehicle components, such as the first and second heat exchangers 15, 16.

As discussed above with respect to FIGS. 1 and 2A-C, in various embodiments, the actuator 202 of the flap system 200 is in electronic communication with a controller, such as the controller 22. Additionally, in various embodiments, the flap system 200 includes at least one flap system sensor 26.

Figure 8:
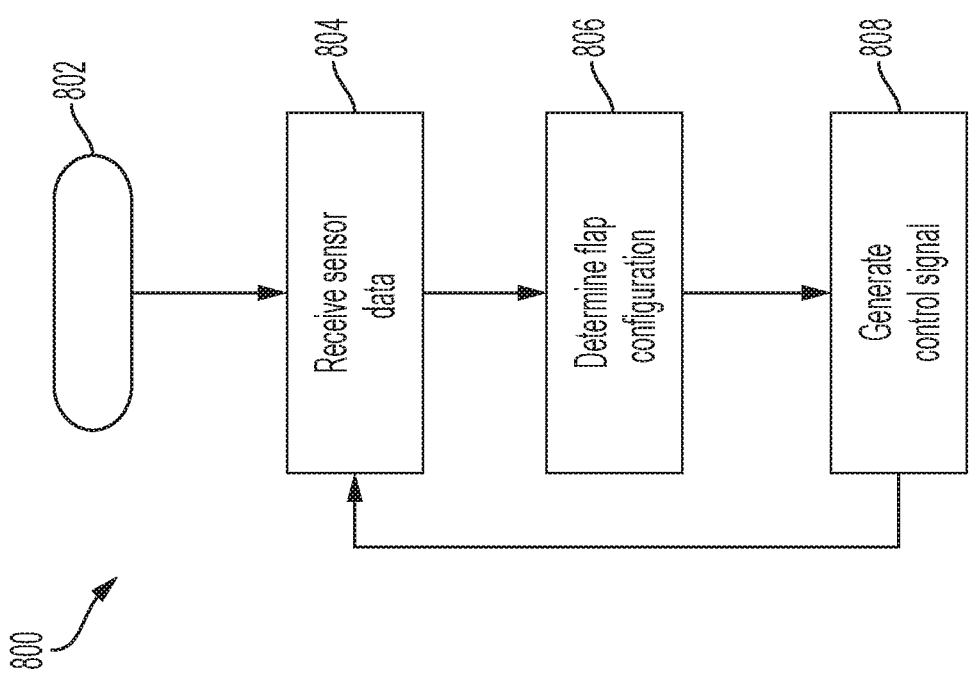
FIG. 8 is a flow chart diagram of a method to control an active controlled integrated flap system, according to an embodiment.

The controller 22 is configured to receive sensor data from the at least one flap system sensor 26, receive sensor data from the plurality of vehicle sensors 27, determine an operating position of one or more of the flaps, and generate a control signal to control the actuator to adjust a position of one or more of the flaps. FIG. 8 illustrates a method 800 to control an aerodynamic surface. The method 800 can be utilized in connection with the flap system 100 and the flap system 200 discussed herein. The method 800 can be utilized in connection with the controller 22 as discussed herein, or by other systems associated with or separate from the vehicle, in accordance with exemplary embodiments. The order of operation of the method 800 is not limited to the sequential execution as illustrated in FIG. 8, but may be performed in one or more varying orders, or steps may be performed simultaneously, as applicable in accordance with the present disclosure.

Beginning at 802, the method 800 proceeds to 804, wherein the controller 22 receives sensor data from the at least one flap system sensor 26 and the plurality of vehicle sensors 27. The sensor data includes, for example and without limitation, vehicle characteristic data such as vehicle speed, ambient temperature, etc., drive unit temperatures, power electronic temperatures, battery temperatures, and/or cabin temperatures and flap system data such as flap position, actuator position, and rotation member position. In various embodiments, at 804 the controller 22 also receives operator input regarding a desired flap position or configuration.

Next, at 806, the controller 22 determines a flap configuration from the sensor data and the operator input. The flap configuration includes a fully open, partially open, or closed position of each of the flaps of the flap system. The method 800 proceeds to 808.

At 808, the controller 22 generates one or more control signals to control the actuator to adjust a position of one or more of the flaps of the flap system. The method 800 then returns to 804 and proceeds as discussed herein or ends.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An actively controlled flap system, comprising:
   a bar defining a rotational axis;
   a first flap rotatably coupled to the bar and configured to rotate about the rotational axis; and a second flap rotatably coupled to the bar and configured to rotate about the rotational axis, the second flap including an opening extending through the second flap;

wherein the first flap is rotatable between a first position in which the opening in the second flap is covered by the first flap and a second position in which the opening in the second flap is uncovered, and the second flap is rotatable between a third position and a fourth position.

2. The actively controlled flap system of claim 1, wherein the first position is a closed position of the first flap and the second position is an open position of the first flap.

3. The actively controlled flap system of claim 1, wherein the third position is a closed position of the second flap and the fourth position is an open position of the second flap.

4. The actively controlled flap system of claim 1 further comprising a sensor configured to measure a vehicle characteristic.

5. The actively controlled flap system of claim 4, wherein the sensor comprises a flap system sensor configured to measure a characteristic of the flap system and a vehicle sensor configured to measure one of a vehicle speed and an ambient temperature.

6. The actively controlled flap system of claim 5 further comprising an actuator coupled to at least one of the bar, the first flap, and the second flap, and a controller in electronic communication with the actuator, the flap system sensor, and the vehicle sensor, the controller configured to receive sensor data from the flap system sensor and the vehicle sensor, determine an operating position of one or more of the first and second flaps, and generate a control signal to control the actuator to adjust a position of one or more of the first and second flaps.

7. The actively controlled flap system of claim 1 further comprising an actuator coupled to the bar, a first rotation member configured to rotate with the bar, and a second rotation member configured to rotate with the bar, wherein the first rotation member interfaces with the first flap to rotate the first flap between the first position and the second position and the second rotation member interfaces with the second flap to rotate the second flap between the third position and the fourth position.

8. The actively controlled flap system of claim 1 wherein the opening is a first opening and the flap system further comprises a third flap rotatably coupled to the bar and configured to rotate about the rotational axis, the third flap including a second opening extending through the third flap, and the third flap is rotatable between a fifth position and a sixth position.

9. An actively controlled flap system, comprising:
an actuator;
a rotatable bar coupled to the actuator, the rotatable bar defining a rotational axis;
a first rotation member configured to rotate with the rotatable bar;
a second rotation member configured to rotate with the rotatable bar;
a first flap rotatably coupled to the rotatable bar and configured to rotate about the rotational axis; and
a second flap rotatably coupled to the rotatable bar and configured to rotate about the rotational axis;
wherein the first rotation member interfaces with the first flap to rotate the first flap between a first flap position and a second flap position and the second rotation member interfaces with the second flap to rotate the second flap between a third flap position and a fourth flap position.

10. The actively controlled flap system of claim 9, wherein the first flap position is a closed position of the first flap and the second flap position is an open position of the first flap.

11. The actively controlled flap system of claim 9, wherein the third flap position is a closed position of the second flap and the fourth flap position is an open position of the second flap.

12. The actively controlled flap system of claim 9 further comprising a sensor configured to measure a vehicle characteristic.

13. The actively controlled flap system of claim 12, wherein the sensor comprises a flap system sensor configured to measure a characteristic of the flap system and a vehicle sensor configured to measure one of a vehicle speed and an ambient temperature.

14. The actively controlled flap system of claim 13 further comprising a controller in electronic communication with the actuator, the flap system sensor, and the vehicle sensor, the controller configured to receive sensor data from the flap system sensor and the vehicle sensor, determine an operating position of one or more of the first and second flaps, and generate a control signal to control the actuator to adjust a position of one or more of the first and second flaps.

15. An automotive vehicle, comprising:
a vehicle body;
a grille system coupled to the vehicle body, the grille system including a first heat exchanger mounted at a first location and a second heat exchanger mounted at a second location;
a bar defining a rotational axis;
a first flap rotatably coupled to the bar and configured to rotate about the rotational axis; and
a second flap rotatably coupled to the bar and configured to rotate about the rotational axis, the second flap including an opening extending through the second flap;
wherein the first flap is rotatable between a first position in which the opening in the second flap is covered by the first flap and a second position in which the opening in the second flap is uncovered, and the second flap is rotatable between a third position and a fourth position.

16. The automotive vehicle of claim 15, wherein the first position is a closed position of the first flap and the second position is an open position of the first flap.

17. The automotive vehicle of claim 15, wherein the third position is a closed position of the second flap and the fourth position is an open position of the second flap.

18. The automotive vehicle of claim 15 further comprising a flap system sensor configured to measure a characteristic of the flap system and a vehicle sensor configured to measure one of a vehicle speed and an ambient temperature.

19. The automotive vehicle of claim 18 further comprising an actuator coupled to at least one of the bar, the first flap, and the second flap, and a controller in electronic communication with the actuator, the flap system sensor, and the vehicle sensor, the controller configured to receive sensor data from the flap system sensor and the vehicle sensor, determine an operating position of one or more of the first and second flaps, and generate a control signal to control the actuator to adjust a position of one or more of the first and second flaps.

20. The automotive vehicle of claim 15 further comprising an actuator coupled to the bar, a first rotation member configured to rotate with the bar, and a second rotation member configured to rotate with the bar, wherein the first rotation member interfaces with the first flap to rotate the first flap between the first position and the second position and the second rotation member interfaces with the second flap to rotate the second flap between the third position and the fourth position.

* * * * *